United States Patent [19]
Chen et al.

[11] Patent Number: 5,712,043
[45] Date of Patent: Jan. 27, 1998

[54] THERMOPLASTIC POLYOLEFIN RESIN COMPOSITION AND LAMINAR ARTICLES HAVING IMPROVED BARRIER PROPERTIES PREPARED

[75] Inventors: Wen-Jer Chen, Kaohsiung; Hsin-Herng Wang, Taichung; Der-Tarng Su; Bin-Yuan Lin, both of Hsinchu; Hsien-Mhing Chen, Hsinchu, all of Taiwan

[73] Assignee: Industrial Technology Research Institute, Hsinchu, Taiwan

[21] Appl. No.: 494,338

[22] Filed: Jun. 26, 1995

[51] Int. Cl.$^6$ .......................... C08L 23/06; C08L 77/02; C08L 77/04; C08L 77/06
[52] U.S. Cl. .......................... 428/500; 525/66; 525/184
[58] Field of Search .......................... 420/500; 525/66, 525/184

[56] References Cited

U.S. PATENT DOCUMENTS

| 5,342,886 | 8/1994 | Glotin et al. | 525/66 |
| 5,419,861 | 5/1995 | Verzaro | 264/82 |

*Primary Examiner*—W. Robinson H. Clark
*Attorney, Agent, or Firm*—Darby & Darby

[57] ABSTRACT

Laminar articles having improved barrier properties to organic solvents and gases, fabricated directly from polyolefin and modified polyamide, are disclosed. The modified polyamide is a blend of 97–40 wt % polyamide and 3–60 wt % of compatabilizer which is a polyether ester amide block copolymer or a mixture of the block copolymer and alkylcarboxyl-substituted polyolefin.

15 Claims, No Drawings

THERMOPLASTIC POLYOLEFIN RESIN COMPOSITION AND LAMINAR ARTICLES HAVING IMPROVED BARRIER PROPERTIES PREPARED

BACKGROUND OF THE INVENTION

1. Field of the Invention

The present invention relates to a polyolefin resin composition and the laminar articles prepared therefrom, which exhibits improved barrier properties to permeation of organic solvents and gases.

2. Description of the Prior Art

Polyolefins have been widly used in the manufacture of containers and packing materials for fluids. However, as they do not exhibit good barrier properties to permeation of organic solvents and gases, their uses are limited.

U.S. Pat. Nos. 2,811,463, 3,862,284, 3,998,180, 4,081,574, 4,142,032, 4,394,333 and 4,467,075, disclose that the barrier properties to the permeation of organic solvents and gases of a plastic film or container can be improved by surface treatment with fluorine and bromine gases. Japan Kokai Koho No. 55-80439 discoses a method of treating the surface of polyolefin articles with fluorocarbon compounds by plasma to improve the barrier properties to the permeation of gasoline and hydrocarbon vapors. U.S. Pat. No. 4,182,457 and Japan Kokai Koho Nos. 59-103726 and 59-103727 disclose that a six-layer structure of polypropylene/adhesive layer/ethylene-vinyl alcohol copolymer/adhesive layer/recycled plastics/polypropylene, which is formed by coextrusion and blow molding and in which ethylene-vinyl alcohol copolymer (EVOH) is used as barrier layer, can effectively act as a barrier to the permeation of gases. U.S. Pat. Nos. 3,857,754 and 3,975,463 disclose a structure of three layers having improved barrier properties which can be formed from a homogeneous molten blend of polyolefin, saponified ethylene-vinyl acetate copolymer and a carbonyl-containing thermoplastic polymer by utilizing high shear equipment. U.S. Pat. No. 3,873,667 discloses a heat treatment process for decreasing the permeability of gases through a homogeneous composition of polyolefin and polyamide. U.S. Pat. No. 3,093,255 discloses a method for preparing polyolefin/polyamide blends by subjecting them to intensive mixing under high pressure. U.S. Pat. Nos. 3,373,222, 3,373,223 and 3,373,224, all disclose dispersant materials such as carboxylated polyethylene, ethylene-acrylic acid copolymer and ethylene-metchacrylic acid copolymer and ionized ethylene-unsaturated carboxylic acid copolymer, that are used to enhance the barrier and mechanical properties of polyolefin/polyamide blends. U.S. Pat. Nos. 4,410,482 and 4,444,817, disclose alkyl carboxyl-substituted polyolefins used as compatabilizers for polyolefines and condensation polymer blends. The resulting blends can be fabricated into laminar articles having improved barrier properties to the permeation of organic solvents and gases.

SUMMARY OF THE INVENTION

The object of the invention is to provide a polyolefine composition which can easily be fabricated into laminar articles having higher barrier properties to the permeation of organic solvents and gases, and simultaneously display good impact resistance and dimensional stability.

The polyolefin composition of the invention is a blend of a polyolefin and a modified polyamide. In fabricated laminar articles, the polyolefin is present as a continuous matrix phase and the modified polyamide is present as a discontinuous distributed phase. The modified polyamide includes 3–60 percent by weight of a compatabilizer. The compatabilizer can be a polyether ester amide block copolymer or a mixture of said polyether ester amide block copolymer and an alkyl carboxyl-substituted polyolefin.

The laminar articles of the invention can be fabricated directly from the blend by, for example, extrusion blow molding method, and the like.

The present invention can be more completely understood by reference to the following detailed descriptions.

DETAILED DESCRIPTION OF THE INVENTION

According to the invention, the polyolefin constitutes 60–98 percent by weight of the composition. Examples of the polyolefin include but are not limited to polyethylene, polypropylene, polybutylene, and copolymers of these materials and the like. Among them, polyethylene(PE) is preferred, and may be high, medium or low density.

The modified polyamides constitute 2–40 percent by weight of the composition, and are a blend of 97–40 percent by weight of aliphatic polyamides or semi-aromatic polyamides or the mixture thereof, and 3–60 percent by weight of compatilizers.

Aliphatic polyamides are made by reacting carboxylic acids with primary amines under well-known conditions, or prepared from lactams or aminocarboxylic acids. Examples of carboxylic acids used in polyamide preparation are adipic acid, suberic acid, sebacid acid, azelaic acid, malonic acid, glutaric acid, pimelic acid, docecanic acid, and the like. Examples of primary amines are tetramethylene amine, pentamethylene amine, hexamethylene amine, octamethylene amine and the like. Examples of aliphatic polyamides include but are not limited to polypentamethylene adipamide, polyhexamethylene adipamide, polyhexamethylene azelamide, polyhexamethylene sebamide, polyhexamethylene dodecanamide, polyhexamethylene sebacamide, caprolactams, and polyamides obtained from amino acids such as 11-aminoundecanoic acid, and the like.

Semi-aromatic polyamides suitable for use in the invention are those prepared from (1) 100 mole % of terephthalic acid and a mixture of 40–60 mole % of 2,2,4-trimethyl hexadiamine and 60–40 mole % of 2,4,4-trimethyl hexadiamine; (2) a mixture of 60–90 mole % isophthalic acid and 10–40 mole % of terephthalic acid and a mixture of 80–98 mole % of hexadiamine and 2–20 mole % of at least one $C_8$–$C_{20}$ aliphatic diamine (containing at least one cyclohexane, for example 1-amino-3-aminomethyl-3,5,5-trimethyl cyclohexane, 1,4-bis(aminomethyl)cyclohexane and bis(ortho-aminocyclohexyl) methane); and (3) 100 mole % of adipic acid and a mixture of 70–100 mole % of isophthalic diamine and 0–30 mole % of hexamethylene diamine, and the like.

The compatabilizer suitable for use in the invention can be a polyether ester amide block copolymer in which the rigid segments are polyamides such as nylon 4–6, 6–10, 6–12, 6, 11, and 12 and the flexible segments are polyethyl glycol, polypropyl glycol, polyethylene glycol, polytetramethylene glycol, polycaprolactone diol, polycarbonate diol and the like.

The compatabilizer can also be a mixture of said polyether ester amide block copolymer and alkylcarboxyl-substituted polyolefin, in which the alkylcarboxyl-substituted polyolefin constitutes up to 85 percent by weight of the mixture.

The alkylcarboxyl-substituted polyolefin compatibilizer is a polyolefin which has carboxylic moieties attached thereto, either on the polyolefin backbone itself or on side chains. The term "carboxylic moiety" means carboxylic groups from the group consisting of acids, esters, anhydrides, and salts. Carboxylic salts are neutralized carboxylic acids, and a compatibilizer which includes carboxylic salts as a carboxylic moiety also includes the carboxylic acid of that slat. Such compatibilizers are termed ionomeric polymers.

Compatibilizers can be prepared by direct synthesis or by grafting. An example of direct synthesis is the polymerization of an α-olefin with an olefinic monomer having a carboxylic moiety; and an example of grafting is the addition of a monomer having a carboxylic moiety to a polyolefin backbone. When the compatibilizer is made by grafting, the polyolefin is a polyethylene; or a copolymer of ethylene and at least one α-olefin of 3–8 carbon atoms such as propylene, and the like; or a copolymer including at least one α-olefin of 3–8 carbon atoms and a diolefin, such as 1, 4-hexadiene, and the like. The polyolefin is reacted with an unsaturated carboxylic acid, anhydride, or ester monomer to obtain the grafted polymer. Representative eligible acids, anhydrides, and esters include: methacrylic acid; acrylic acid; ethacrylic acid; glycidyl methacrylate; 2-hydroxy ethylacrylate; 2-hydroxy ethyl methacrylate; diethyl maleate, monoethyl maleate; di-n-butyl malcate; maleic anhydride; maleic acid; fumaric acid; itaconic acid; monoesters of such dicarboxylic acids; dodecenyl succinic anhydride; 3-norbornene-2, 3-anhydride; nadic anhydride (3,6-endomethylene-1,2,3, 6-tetrahydrophthalic anhydride); and the like. Generally, the graft polymer will have from about 0.01 to about 20, preferably about 0.1 to about 10, and most preferably about 0.2 to about 5, weight percent graft monomer.

When the compatibilizer is made by direct synthesis, the polymeric material is a copolymer of an α-olefin of 2–10 carbon atoms and an α, β-ethylenically unsaturated carboxylic acid, ester, anhydride, or salt having 1 or 2 carboxylic moieties. The directly synthesized compatibilizer is made up of at least 75 mole percent of the olefin component and from about 0.2 to 25 mole percent of the carboxylic component.

The ionomeric compatibilizer is preferably made of directly synthesized compatibilizer and of about 90 to 99 mole percent of olefin and about 1 to 10 mole percent of α, β-ethylenically unsaturated monomer having carboxylic moieties, wherein the moieties are considered as acid equivalents and are neutralized with; (1) metal ions having valences of 1 to 3, inclusive, when the carboxylic acid equivalent is monocarboxylic, and (2) metal ions having a valence of 1 when the carboxylic acid equivalent is dicarboxylic. To control the degree of neutralization, metal ions are present in an amount sufficient to neutralize at least 10 percent of the carboxylic moieties. Representative eligible 60 -olefins and unsaturated carboxylic acid, anhydride, and ester monomers are those previously described herein.

The modified polyamides of the invention are obtained by first blending the previously described polyamides and compatabilizers, and then extruding by using, for example, a single screw or twin screw extruders, and are then pelletized. The pelletized, modified, polyamides thus obtained have excellent adhesion to polyolefins, and thus can be blended with polyolefins and then fabricated into laminar, shaped articles directly by, for example, blow molding, co-extrusion, or sheet extrusion molding methods. Additives which will not influence the formation of laminar structure and the desired physical properties of the articles, for example, colorants, lubricants, stabilizers and fillers, can be added to the blend prior to the fabrication process.

The laminar, shaped articles of the invention display good barrier properties to various organic liquids, such as commerical-use solvents, thinners or dispersants. Typical organic liquids include aliphatic hydrocarbons, e.g. crude gasoline, heptane, aromatic hydrocarbons, e.g. toluene and xylene, and halogenated hydrocarbons, e.g. trichloro ethane, and ortho-dichloro benzene. The polyolefin/modified polyamide composition of the invention also has good barrier properties to the vapors of the above organic fluids.

The following example illustrates the invention without limiting its scope.

EXAMPLE

Modified polyamides A, B, C and D were prepared by blending polyamides, polyether ester amide block copolymer and modified polyolefins and then mixing in an extruder at 220° C.–260° C., and were then pelletized. The weight ratios of each components of the blend are summarized in Table 1 below.

TABLE 1

| modified polyamide | polyamide | polyether ester block copolymer | modified polyolefin |
|---|---|---|---|
| A | 94[1] | 6 | — |
| B | 85 | 5 | 10[2] |
| C | 75.5 | 4.5 | 20 |
| D | 94[3] | 6 | — |

Note:
[1] Nylon 6
[2] maleic anhydride modified high density PE, 0.22 weight percent grafted
[3] Zytel 330 (E.I. du Pont de Nemours and Company, semi-aromatic amorphous nylon)

Blends 2, 3, 4, 5, 6 and 7 were prepared by blending thoroughly high density polyethylene and the above obtained modified polyamides. The weight ratios of the high density PE and modified polyamides are summarized in Table 2. Blends were then fed into a low shear extrusion blow molding machine, and bottles with a capacity of about 1 liter were blow molded at an extrusion temperature of about 225° C. As a control, bottles were also made from blend 1 which is a mixture of high density PE and commerical available Nylon 6 in the same extrusion blow molding machine at the same extrusion temperature.

TABLE 2

| Blend | High density P.E. | Nylon 6 | Modified polyamide |
|---|---|---|---|
| 1 | 93 | 7 | — |
| 2 | 97 | — | 3(A) |
| 3 | 90 | — | 10(A) |
| 4 | 93 | — | 7(B) |
| 5 | 95 | — | 5(B) |
| 6 | 95 | — | 5(C) |
| 7 | 90 | — | 10(D) |

Bottles thus formed were tested for permeation of xylene and impact strength. Barrier to permeation was tested by adding 800 g of xylene to bottles, sealing the bottles, and then determining the weight loss after 30 days at a temperature of about 25° C. and a relative humidity of less than 50%. Impact strength was tested by filling the bottles with water, sealing the bottles and then letting them free fall from a 1.2-meter height. Test results are summarized in Table 3.

TABLE 3

|  | Permeation barrier (g-loss) | Impact Strength |
|---|---|---|
| High density PE | 22.95 | not broken |
| Blend 1 | 2.27 | broken |
| Blend 2 | 1.00 | not broken |
| Blend 3 | 0.24 | not broken |
| Blend 4 | 0.22 | not broken |
| Blend 5 | 0.32 | not broken |
| Blend 6 | 0.42 | not broken |
| Blend 7 | 0.31 | not broken |

As shown in Table 3, the bottles of the invention exhibited excellent barrier properties to permeation of xylene as opposed to the bottles prepared from high density PE or a blend of high density PE and unmodified polyamide, as well as good impact strength.

What is claimed is:

1. A polyolefin based composition comprising:

90 to 97 percent by weight of a polyolefin; and 3 to 10 percent by weight of a polyamide which is a blend of
   (i) from 75 to 94 percent by weight of an aliphatic polyamide or a semiaromatic polyamide or a mixture thereof; and
   (ii) from 6 to 25 percent by weight of a compatibilizer which comprises from 15 to 100 percent by weight of a polyether ester amide block copolymer and from 0 to 85 percent by weight of an alkylcarboxyl-substituted polyolefin.

2. The composition as claimed in claim 1, wherein said polyolefin is selected from the group consisting of polyethylene, polypropylene, polybutylene and the copolymer thereof.

3. The composition as claimed in claim 1, wherein said alkylcarboxyl-substituted polyolefin is a polyolefin which has a carboxylic moiety attached on the polyolefin backbone or on side chains.

4. The composition as claimed in claim 3, wherein said carboxylic moiety is a carboxylic group selected from the group consisting of acids, esters, anhydrides and salts.

5. A laminar, shaped article prepared by blending 90 to 97 percent by weight of a polyolefin; and 3 to 10 percent by weight of a polyamide which is a blend of
   (i) from 75 to 94 percent by weight of an aliphatic polyamide or a semiaromatic polyamide or a mixture thereof; and
   (ii) from 6 to 25 percent by weight of a compatibilizer which comprises from 15 to 100 percent by weight of a polyether ester amide block copolymer and from 0 to 85 percent by weight of an alkylcarboxyl-substituted polyolefin;

and then fabricating the blend.

6. The laminar, shaped article as claimed in claim 5, wherein the blend is fabricated into a laminar, shaped article by the blow molding method.

7. The laminar, shaped article as claimed in claim 5, wherein the blend is fabricated into a laminar, shaped article by the extrusion method.

8. The laminar, shaped article as claimed in claim 5 wherein, said polyolefin is selected from the group consisting of polyethylene, polypropylene, polybutylene and the copolymer thereof.

9. The laminar, shaped article as claimed in claim 5, wherein said alkylcarboxyl-substituted polyolefin is a polyolefin which has a carboxylic moiety attached on the polyolefin backbone or on side chains.

10. The laminar, shaped article as claimed in claim 9, wherein said carboxylic moiety is a carboxylic group selected from the group consisting of acids, esters, anhydrides and salts.

11. The laminar, shaped article as claimed in claim 5, being a container.

12. A composition comprising:
    (a) 90 to 97 percent by weight of a polyethylene, and
    (b) 3 to 10 percent by weight of a polyamide which is a blend of
    (i) from 75 to 94 percent by weight of a nylon; end
    (ii) from 6 to 25 percent by weight of a compatibilizer which comprises from 15 to 100 percent by weight of a polyether ester amide block copolymer and from 0 to 85 percent by weight of an alkylcarboxyl-substituted polyethylene.

13. A laminar, shaped article prepared from a composition of claim 12.

14. The laminar, shaped article of claim 13 wherein said article is prepared by the blow molding method.

15. The laminar, shaped article of claim 13 wherein said article is prepared by the extrusion method.

* * * * *